United States Patent [19]

Fisher

[11] Patent Number: 4,723,628

[45] Date of Patent: Feb. 9, 1988

[54] EVACUATION SLIDE

[75] Inventor: John M. Fisher, Cuyahoga Falls, Ohio

[73] Assignee: The B. F. Goodrich Company, Akron, Ohio

[21] Appl. No.: 865,699

[22] Filed: May 22, 1986

Related U.S. Application Data

[63] Continuation of Ser. No. 677,628, Dec. 3, 1984, abandoned.

[51] Int. Cl.4 .......................... A62B 1/20; B64D 25/14
[52] U.S. Cl. .................................. 182/48; 244/137.2; 244/905; 193/25 B
[58] Field of Search ...................... 182/48, 49, 76, 82, 182/70; 244/137 P, DIG. 2; 193/25 B

[56] References Cited

U.S. PATENT DOCUMENTS

| | | | |
|---|---|---|---|
| 260,627 | 7/1882 | Townsend | 182/76 |
| 1,604,444 | 10/1926 | Eastman | 182/48 |
| 3,458,009 | 7/1969 | Favors | 182/48 |
| 3,692,144 | 9/1972 | Summer | 182/48 |
| 3,910,377 | 10/1975 | Zamorski | 182/48 |
| 3,973,645 | 8/1976 | Dix | 182/48 |
| 4,013,247 | 3/1977 | Griffin | 182/48 |
| 4,018,321 | 4/1977 | Fisher | 182/48 |
| 4,333,546 | 6/1982 | Fisher | 182/48 |
| 4,434,870 | 3/1984 | Fisher | 182/48 |

*Primary Examiner*—Reinaldo P. Machado
*Assistant Examiner*—A. Chin-Shue
*Attorney, Agent, or Firm*—Joseph Januszkiewicz

[57] ABSTRACT

An inflatable escape slide having an inflatable platform that provide a horizontal walkway from an elevated vehicle such as a train. An inflatable slide portion is connected to the platform and is deployable in a longitudinal direction that is in the same general direction as the train thus ensuring deployment where clearance space to either side of the elevated train is limited. The escape slide and platform are an integral unit.

4 Claims, 7 Drawing Figures

EVACUATION SLIDE

This is a continuation of application Ser. No. 06/677,628, filed Dec. 3, 1984, now abandoned.

BACKGROUND OF THE INVENTION

This invention relates to an inflatable evacuation slide device and more particularly to an inflatable slide for use on elevated trains where there is a restricted clearance space on either side of the railway car. Heretofore, the evacuation of passengers from elevated trains was substantially non-existent except for use of existing structural supports and conventional platforms at spaced intervals. Conventional slides that deployed transversely of the length of the train had limited application. The present invention is directed to a novel inflatable escape slide which provides a cantilever type inflatable porch or platform immediately adjacent a side exit or access door of a train which in turn is connected to an inclined inflatable slide which is deployed in a direction parallel to the length of the train thereby insuring its proper deployment under substantially all conditions of evacuation need including very restricted right of way clearances thus insuring the safety of passengers under all conditions of use.

SUMMARY OF THE INVENTION

An inflatable evacuation slide for an elevated vehicle such as a train wherein the escape slide has a platform located immediately adjacent one of the exit doors of the vehicle to facilitate the movement of passengers away from the vehicle. The platform is connected to an inflatable slide that lies in the same general direction as the train thus enabling its deployment where there is little clearance space along the path of train's movement.

DETAILED DESCRIPTION OF THE INVENTION

Figure 1:
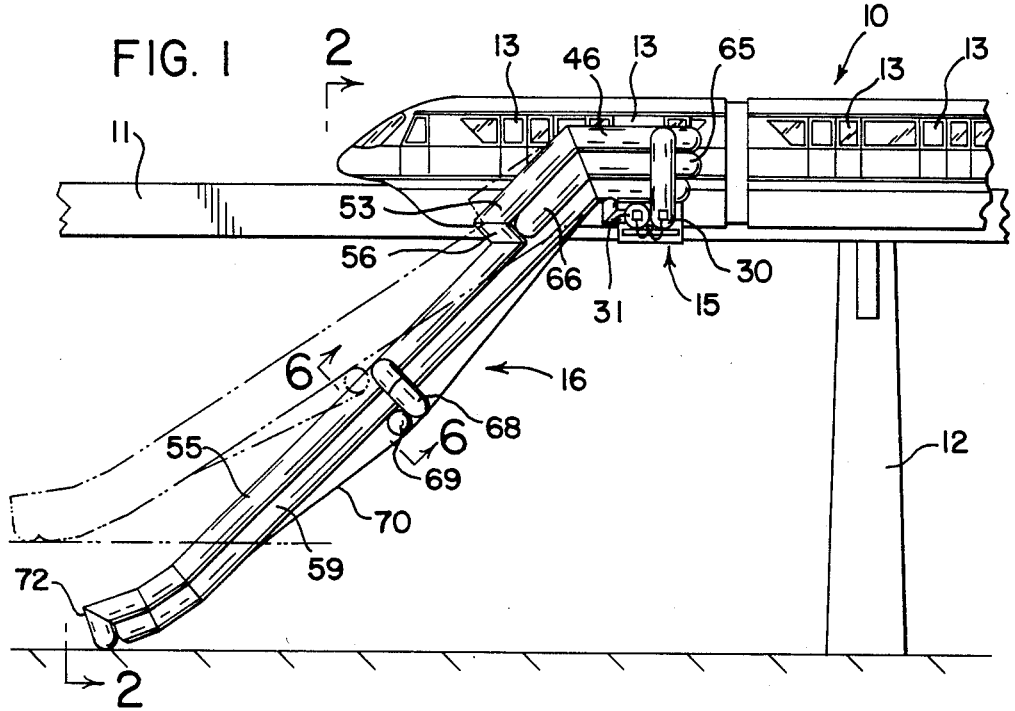
FIG. 1 is a side elevational view of a multi-ribbed inflatable escape slide extending from an elevated train to the ground with the slide shown in phantom lines wherein the distance between the train and ground level is reduced.
Figure 2:
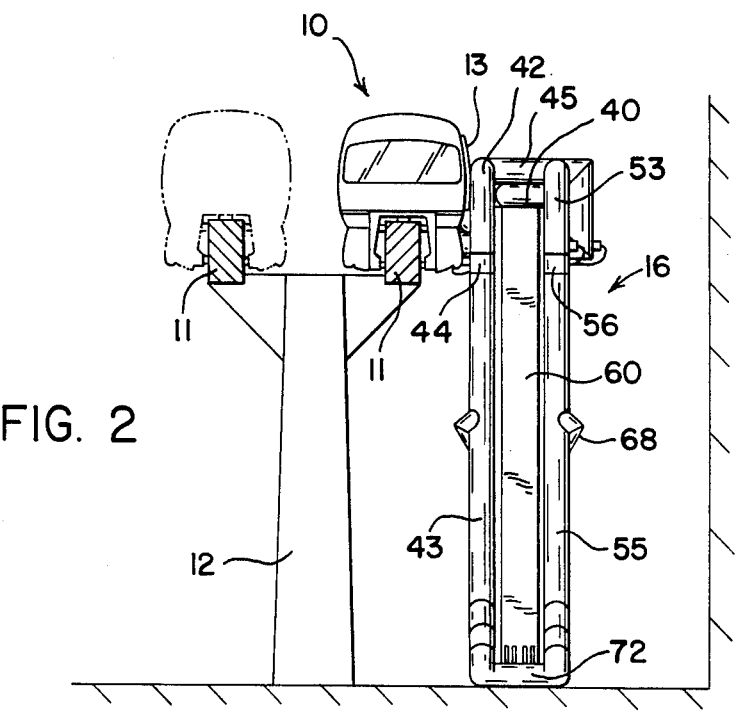
FIG. 2 is a front elevational view of the inflatable escape slide of FIG. 1 taken on line 2—2 showing the elevated train.

Referring now to the drawings wherein like reference numerals designate like or corresponding parts throughout the several views, there is shown in FIG. 1 a train 10 mounted for movement on one of a pair of laterally spaced rails 11 which in turn are suitably supported by a plurality of longitudinally spaced columns 12 (only one shown). The train 10 has a plurality of access doors 13 spaced along its one side to facilitate the loading and unloading. Mounted to one side of selected doors of the train is a storage means 15 (FIGS. 5 and 7) for an inflatable escape slide 16.

Figure 5:
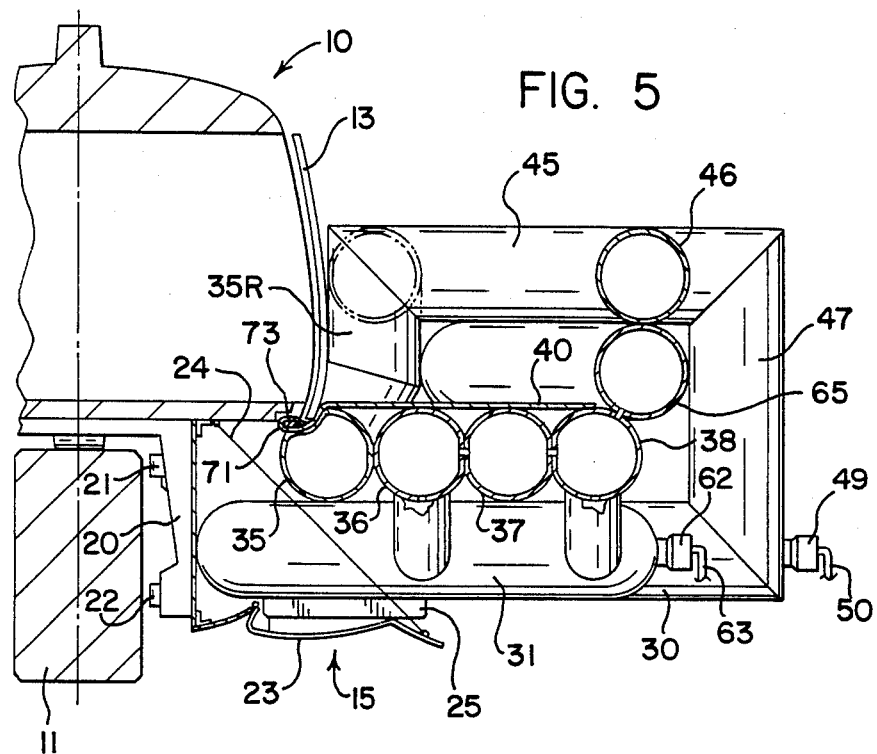
FIG. 5 is a cross-sectional view of the inflatable escape slide taken on line 5—5 of FIG. 3 showing a portion of the train and the storage compartment and its hinged door.

The storage means or compartment 15 is mounted on a depending support 20 that also journals rollers 21 and 22 which are adapted to engage rail 11. Storage means 15 has a door 23 suitably hinged which upon opening will extend to a horizontal position and held in place by a cable 24 which interconnects the door 23 to a support bracket within the upper portion of the storage compartment 15. The door 23 has a planar support member 25 supporting a pair of horizontally extending inflatable tubes 30 and 31 that extend in a direction outwardly or in a direction that is normal to the access or exit doors 13. Mounted above and transversely of the pair of tubes 30 and 31 are a plurality of inflatable tubes 35, 36, 37 and 38 (FIG. 5). All of such tubes 35 through 38 are suitably bonded to adjacent tubes preferably along their side portions. In addition the tubes 35 through 38 are bonded along their lowermost sides to the top of the horizontally extending tubes 30 and 31. A panel 40 is fastened tangentially to the inflatable tubes 35 through 38 to provide a platform, porch or walkway from the exit passageway of door 13. Such platform or walkway on panel is maintained in a horizontal position when escape slide is deployed by the inflatable tubes 35 through 38 and tubes 30, 31 as well as by the door 23 which is held in a horizontal plane by the cable 24.

Figure 3:
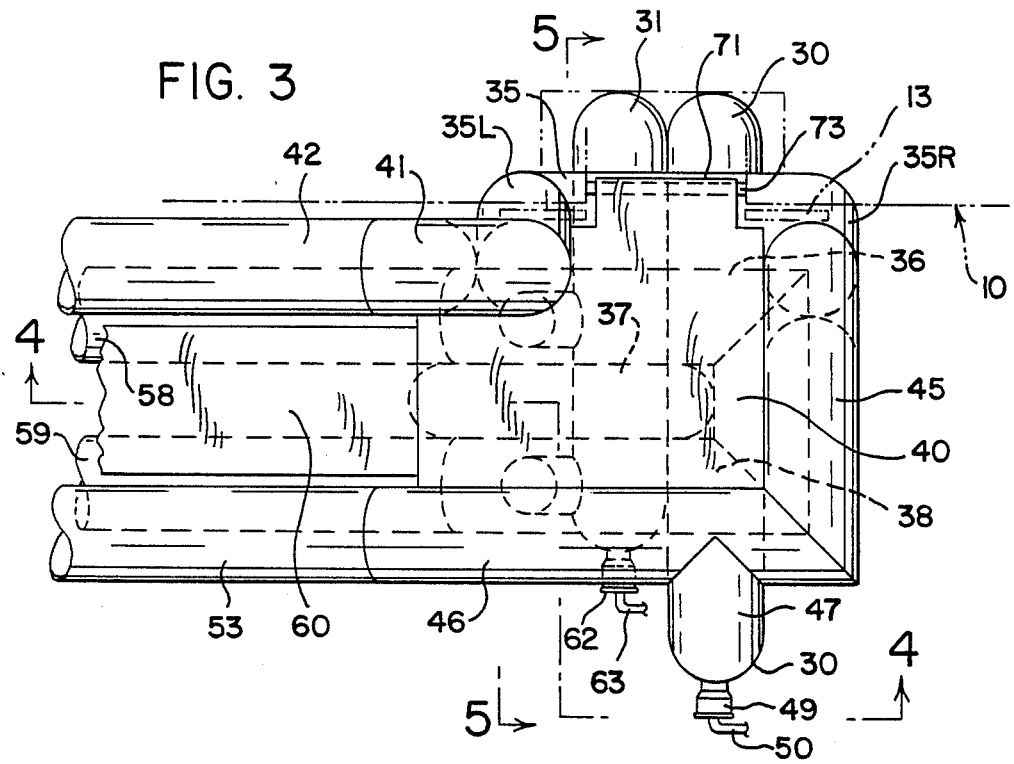
FIG. 3 is an enlarged plan view of that portion of the inflatable slide adjacent the train.
Figure 4:
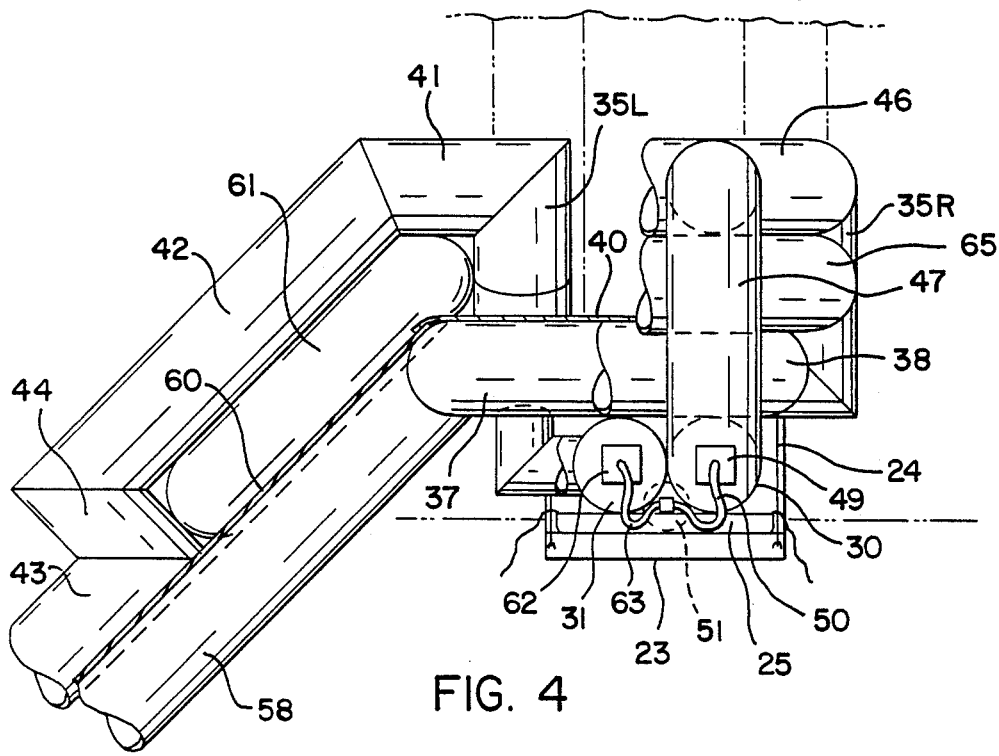
FIG. 4 is a partial side elevational view of the upper portion of the inflatable escape slide, partly in cross-section, taken on line 4—4 of FIG. 3.

The inflatable tube 35 extends upwardly on either side of the door 13 designating such upward extensions of the tube 35 as inflatable tubes 35L and 35R (FIGS. 3 and 5). Tube 35L communicates directly with a horizontally extending tube 41 which in turn communicates directly with a downwardly inclined inflatable tube 42 that communicates in turn with another inclined tube 43 via a short connecting tube 44. Tube 35R communicates directly (FIG. 5) with a horizontally extending tube 45 which in turn communicates directly with a horizontally extending tube 46 that is normal to such tube 45. As shown in FIG. 4 tube 46 communicates with a vertically disposed tube 47 which tube 47 in turn communicates directly with tube 30. Tube 30 has an aspirator 49 (FIGS. 3 and 5) connected thereto which is used to inflate tube 30 and the other tubes connected thereto. Aspirator 49 has a conduit 50 connecting it to a regulator and bottle or reservoir assembly 51 of compressed gas. Aspirators as is well known in the art utilize air from a compressed gas source and aspirate ambient air to inflate life rafts, escape slide, bag or other inflatables. As example of prior art, U.S. Pat. No. 2,975,958 shows an aspirating nozzle, aspirating tube and closure valve. U.S. Pat. No. 3,056,540 shows an aspirating passageway and valves. Also see U.S. Pat. No. 4,368,009 to John Heimovics, Jr. et al which shows another type of aspirator device that is used to inflate escape slides. Inflatable tube 46 (FIGS. 1 and 3) communicates with inclined tube 53 which in turn communicates with inclined tube 55 via connecting tube 56.

The inflatable tubes 36 and 38 which form part of the main support for the platform or porch panel 40 communicate directly with a pair of lower inclined inflatable tubes 58 and 59 respectively, which tubes 58 and 59 have a slide panel 60 suitably attached or adhered to their upper surfaces by any suitable means. The respective lower inclined inflatable tubes 58 and 59 are connected or attached along their upper outer sides to the upper inclined inflatable tubes 43 and 55 forming an escape slide with protective side constraints or guides.

As seen in FIG. 4, inflatable tube 31 is connected via aspirator 62 and conduit 63 to reservoir or bottle 51. The compressed air via aspirator 62 inflates the lower set of tubes such as tubes 31, 36, 37, 38 and tube 65, which in turn communicates directly with inclined tube 59 (as seen in FIG. 1). Inclined tube 59 is suitably adhered along its upper surface to the lower surface of upper inclined tube 55 (FIGS. 1 and 6) to help insure deployment of the escape slide.

Figure 6:
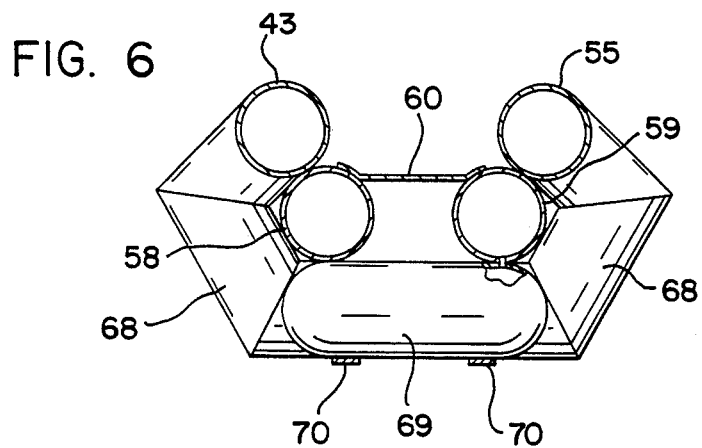
FIG. 6 is a cross-sectional view of the inflatable escape slide taken on line 6—6 of FIG. 1.

A truss bag 78 for side lateral support is also provided midway along the escape slide, transverse to the longitudinal line of the inclined inflatabe tubes 43, 55, 58 and 59. As seen in FIGS. 1 and 6, such truss bag 68 encompasses the escape slide along the bottom and both side portions, communicating with the two upper inflatable tubes 43 and 55. Mounted closely adjacent to the lower cross portion of truss bag 68 is a truss tube 69 fastened to the undersides of the two lower tubes 58 and 59 which is at a position approximately one-half the length of the escape slide. Such truss tube 69 communicates via suitable ports to tubes 58 and 59 and accordingly is inflated simultaneously with such tubes. A truss strap 70 attached at its respective ends to the upper end portion and the lower end portion 72 of the escape slide engages both the truss bag 68 and the truss tube 69, to provide tension to the escape slide and prevent its sagging in the middle of the slide. In the truss arrangement as shown, the truss will function to provide tension to the escape slide with either inflatable truss bag 68 or truss tube 69 deflated and either tube 69 or bag 78 will have approximately the same bending resistance.

The inflatable tubes as deployed are adhesively bonded to each other so that upon inflation will form a rigid supporting porch, or platform and escape slide. The inflatable tubes are preferably fabricated from a neoprene rubber coated nylon fabric. The panel 40 which serves as a walkway for the porch is preferably coated with a non-slip rubber coating to improve the passenger's footing on such walkway. Such panel 40 may be attached to the foot of the exit door by any number of well known means, however as shown in FIG. 5 an exterior flat 71 is suitably attached to a bar 73 located inside the train body thereby supporting the exit door end of the panel or walkway 40.

Figure 7:
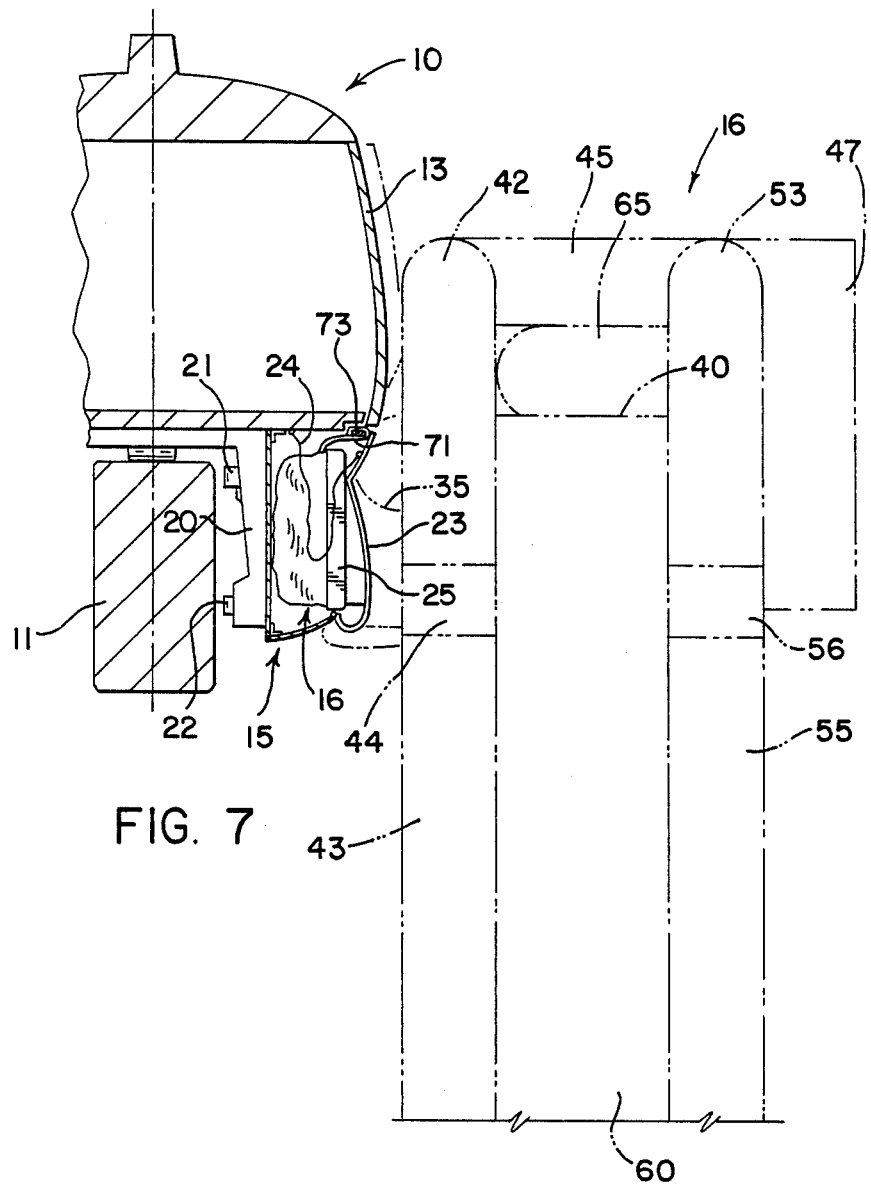
FIG. 7 is a partial cross-sectional view of the elevated train with the escape slide stored in a storage compartment therein and showing in phantom lines a portion of the escape slide deployed.

The slide as shown in FIG. 7 is disposed and folded within the storage means 15 having the swinging door 23 forming part of such compartment confining means. Upon release of the door 23, compressed air from the bottle 51 will inflate via aspirators 49 and 62 their respective sets of tubes. Aspirator 62 is connected to inflatable tube 31 and will inflate such tube immediately. Tubes 36 and 38 which are connected to tube 31 will also inflate as will tube 37, 65, 58, 61, 69 and 59 which are the lower set of inflatable tubes. Aspirator 49 is connected to inflatable tube 30 and will inflate such tube immediately. Tubes 47 (FIG. 4), 46, 45, 35, 41, 42, 43, 53, 68, and 55 are all connected to such tube 30 and will also inflate with such tube, which tubes are considered the upper inflatable set of tubes. Thus, with either and first or second set of tubes inflated, egress can be assured. With the tubes all inflated, the passengers in the train can exit to the platform and then use the deployed escape slide which is disposed in the general direction of the train to assure full deployment of the escape slide under conditions where clearance space to either side of the train ordinarily would present problems of escape slide deployment.

Various modifications are contemplated and may obviously be resorted to by those skilled in the art without departing from the described invention, as hereinafter defined by the appended claims, as only a preferred embodiment thereof has been disclosed.

I claim:

1. A self supporting inflatable evacuation device for emergency use from an elevated structure wherein such elevated structure has an elongated body with a longitudinal centerline, said inflatable device having a first inflatable portion that extends outwardly away in a first direction defining a platform from such elevated structure to be evacuated, said elongated body having one side surface with an opening for ingress and egress of passengers therefrom, inflating means operative upon actuation to deploy said self supporting evacuation device outwardly away from said elevated structure, said platform located adjacent said opening, said first inflatable portion is supported by a horizontally extending rigid support member to provide a cantilever support for said platform, said rigid support member moveable into said cantilever position upon deployment of said evacuation device, said rigid support member being a rigid door of a compartment that stores said first and said second portions in a deflated condition, said compartment being located beneath said elevated structure housing and inflating means, said inflatable device having a second inflatable portion with a flexible panel defining a slide surface extending perpendicularly from said first portion and parallel to said longitudinal centerline, said slide surface projecting downwardly at an angle to a foot end of said inflatable evacuation device, and one side surface of said escape slide lying in a vertical plane that lies closely adjacent to said one side surface of said elongated body.

2. An inflatable evacuation device as set forth in claim 1 wherein said compartment and said rigid support member are exterior of said elevated supporting structure and adjacent said opening.

3. An inflatable escape slide adapted to extend from an elevated train structure having a longitudinal centerline, said train structure having a pair of generally planar side surfaces that are parallel to said longitudinal centerline, one of said side surfaces having an opening therein for the ingress and egress of passengers, said opening having a pair of sides and a bottom surface, the centerline of said opening lying along a line that is generally normal to said centerline of said train, said escape slide having an inflatable horizontally extending platform that has one side abutting said bottom surface of said opening, said escape slide having an integral portion with said platform inclined downwardly from said platform to a lower ground engaging surface, said escape slide is retained in an uninflated condition in a compartment directly below said opening, said compartment is an integral self contained unit mounted to the exterior of said train structure, said platform is supported solely by cantilever support means that is part of said compartment, and said downwardly inclined slide portion being parallel to said centerline of said train structure and having one side surface in vertical alignment with said side surface of said train structure operative to direct passengers away from said opening of said train structure.

4. An inflatable escape slide as set forth in claim 3 wherein said cantilever support means includes a rigid support member supporting inflatable tubes that support said platform.

* * * * *